UNITED STATES PATENT OFFICE 2,478,077

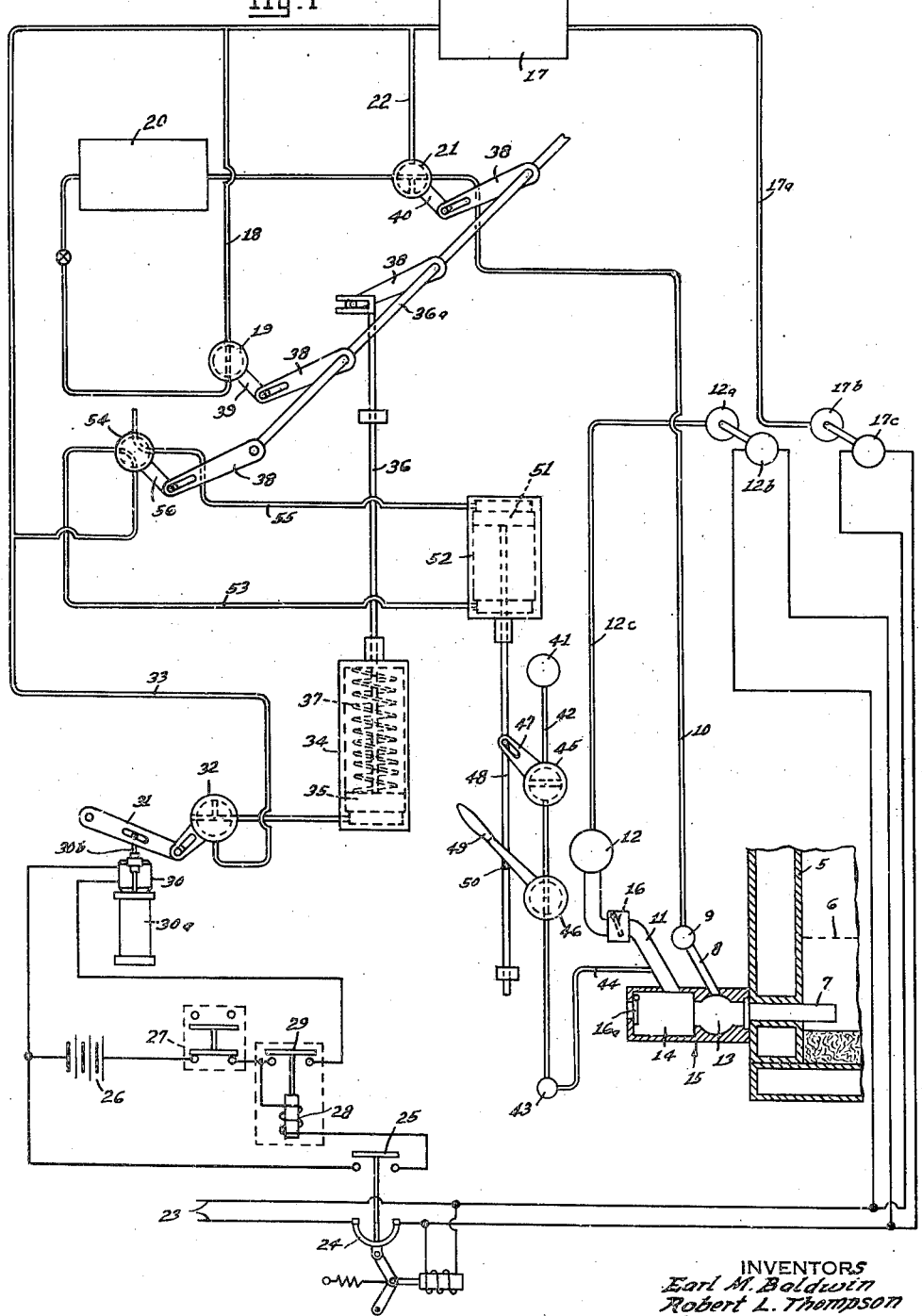

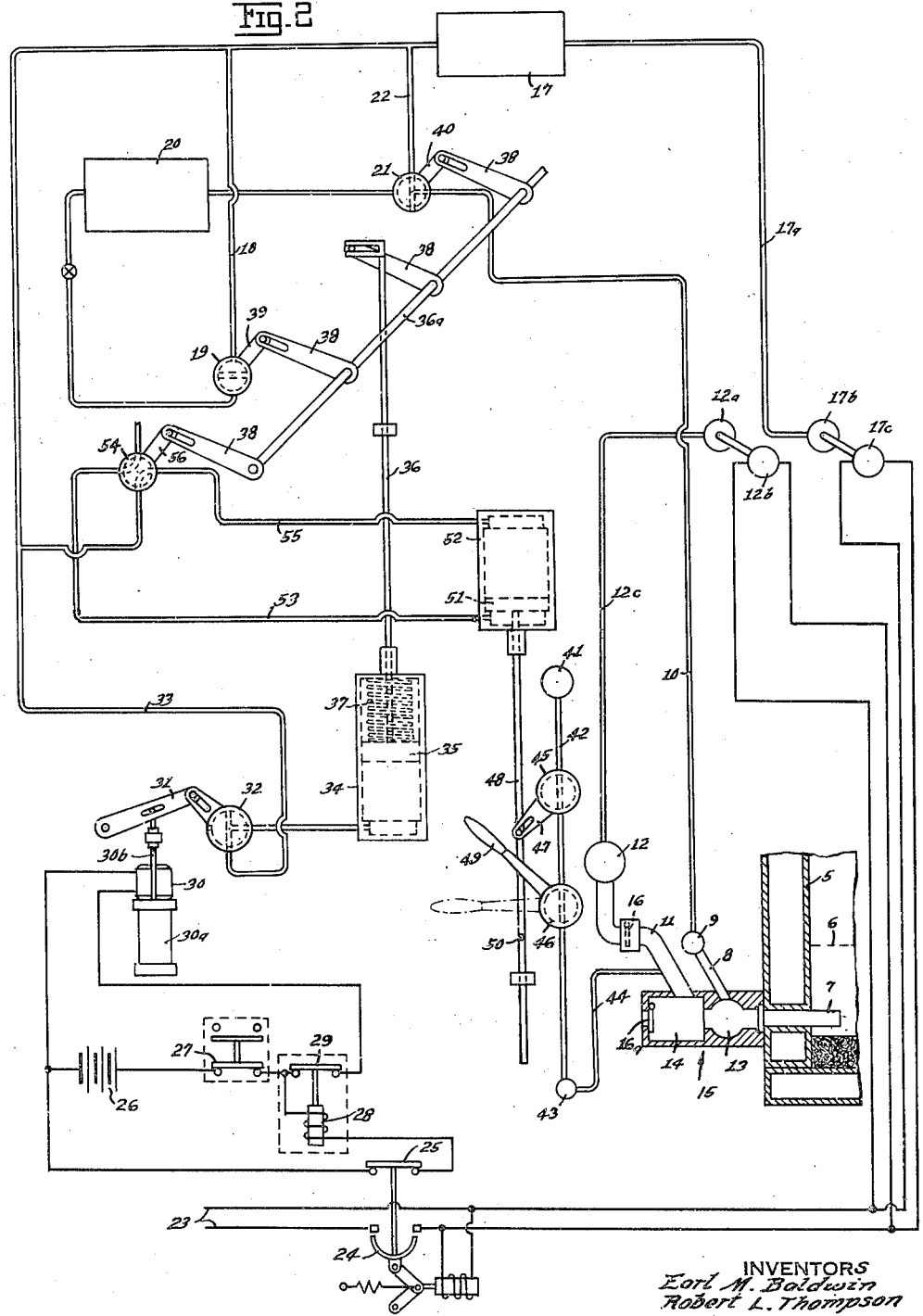

APPARATUS FOR PROTECTING FURNACE TUYÈRES

Earl M. Baldwin and Robert L. Thompson, Helena, Mont., assignors to Anaconda Copper Mining Company, a corporation of Montana Application May 2, 1946, Serial No. 666,578

7 Claims. (Cl. 266—30)

This invention is concerned with protecting metallurgical furnace tuyères from injury by the flow of molten slag or metal from the furnace back into or through the tuyères. In normal operations of such furnaces, a steady stream of air under pressure blowing into the furnace through the tuyères prevents back-flow of slag or metal into the tuyères. If the supply of air is interrupted, however, as by a failure of the power supply to the air compressors or blowers, molten slag or metal may flow back into the tuyères and cause a great deal of damage. This invention provides a very effective system for automatically injecting water into the tuyères in the event of a power failure interfering with the supply of air under pressure, so as to freeze the metal adjacent the ends of the tuyère pipes within the furnace and so prevent molten metal or slag from flowing back into the tuyères.

The invention herein described and claimed may advantageously be combined with the tuyère-protecting system described and claimed in U. S. Patent No. 2,334,878, granted November 23, 1943, on an application of Alexander Laist and Earl M. Baldwin, so as to secure the conjoint benefits of both inventions. If desired, however, the system herein described for injecting water into the tuyères may be used independently of the system described in the Laist-Baldwin patent.

Metallurgical furnaces often are equipped with tuyères so that air, or a mixture of fuel and air, may be blown into a body of molten metal or slag contained within the furnace. Such furnaces are used, for example, for recovering volatile metals such as zinc from lead smelter slags. In this case, air and fuel are blown through the furnace tuyères into a body of molten lead smelter slag in the furnace. The zinc contained in the slag is reduced to metallic form and volatilized, and the zinc vapor passing out of the furnace is burned to zinc oxide and is cooled in a baghouse or the like.

The compressed air blown in through the tuyères generally is provided by a compressor driven by an electric motor. Failures of electric power supply occur frequently in some smelting districts and may cause serious and costly trouble in the furnace operation. In the furnace treatment of lead smelter slags as mentioned above, for example, the molten slag stands about four feet above the tuyères in the furnace, and when the air pressure falls off because of a power failure, the molten slag flows back into the tuyères and connector pipes, burning any hose connections, injuring valves, and freezing in the tuyère pipes and tuyère fittings. When this occurs, a furnace shut-down of several hours at least and considerable repair work is unavoidable. Unless proper safeguards are taken, this can be the costly consequence of a power failure that may be of only a few minutes duration, and that otherwise would have no serious effect on furnace operations.

In the above-mentioned Laist-Baldwin patent, a system is described for connecting the tuyères directly to a reservoir of high-pressure compressed air immediately upon the occurrence of an electric power failure. The high-pressure air admitted directly to the tuyères serves to prevent the molten slag in the furnace from flowing back into the tuyères. This system has been very effective for protecting the tuyères. The present invention is designed, when used in conjunction with the system of the Laist-Baldwin patent, to provide additional protection for the tuyères. If desired, however, the system provided by the present invention may be used independently as the chief tuyère-protecting system in the event of a power failure.

In accordance with the present invention, a source of water is connected, by means of a conduit including a valve, to the tuyères. Means responsive to interruptions in the power supply for furnishing the compressed air normally blown through the tuyères are provided for opening the valve to admit water to the tuyères whenever the supply of power is interrupted. The means through which the water valve is opened in the event of a power interruption advantageously are energized by an independent source of electric power. The conduit through which water is admitted to the tuyères advantageously includes two valves, one of which is closed during normal operations of the furnace but is arranged to be opened automatically in the event of a power failure emergency calling for the admission of water to the tuyères, and the other of which is opened during normal operations of the furnace but is arranged for being closed manually or otherwise when sufficient water has been admitted to the tuyères to meet the emergency. Provision may be made to hold this second valve open so long as the furnace is operating normally, so that it cannot accidentally be closed to prevent admission of water to the tuyères when an emergency occurs.

Pneumatic means actuated by compressed air from a compressed air reservoir advantageously serve to open the water valve in the event of a power failure. The control means which respond to an interruption in the power supply may then be arranged for admitting compressed air to the pneumatic means so as to actuate the latter to open the water valve whenever the power supply is interrupted. The pneumatic means also may be arranged so as normally to hold this valve in the closed position, and also normally to hold the second manually or otherwise operated shut-off valve in the open position. This arrangement advantageously is such that upon the occurrence of a power failure resulting in actuation of the pneumatic means to open the first valve in the water conduit, the pneumatic means simultaneously releases the second manually or otherwise operated valve so that it can be closed at the will of the operator any time prior to return of the pneumatic means to its normal operating position.

An embodiment of the present invention in which it is combined with the pneumatic safeguarding system described in the above-mentioned Laist-Baldwin patent is shown in the accompanying drawings, wherein Fig. 1 is a diagrammatic view of the tuyere-protecting system in its normal operating condition; and Fig. 2 is a diagrammatic view of the system following a power interruption.

The drawings show the lower corner of a furnace 5 in which the molten slag level is indicated at 6. A plurality of spaced tuyères 7 extend into the furnace well below the slag level. To simplify the drawings only one tuyère with its associated connections is shown, but in an actual installation a series of tuyères at intervals completely around the furnace ordinarily is provided. Powdered coal and high-pressure air, say at about eighty pounds per square inch, are blown into each tuyère through a branch pipe 8 connected to a distributing pipe 9 which in turn is connected to an air-fuel feed pipe 10. Additional combustion air at a lower pressure is supplied to each tuyère through a branch pipe 11 connected to a bustle pipe 12. This low-pressure combustion air is supplied by a blower 12a driven by a motor 12b. The blower is connected to the bustle pipe by a low-pressure air line 12c.

The branch pipes 8 and 11 discharge into the chambers 13 and 14 in the tuyère fitting 15. A check valve 16 in the branch pipe 11 prevents air from the high-pressure source from escaping through the low-pressure air pipes when the low-pressure air is cut off by a power interruption. A second check valve 16a normally closes an opening at the back of the tuyère fitting through which the tuyère may be punched with a steel bar to break up solid accretions of slag or metal whenever they form at the end of the tuyères 7 and prevent free flow of air and fuel into the charge within the furnace.

One or more high-pressure air receivers 17 are provided to contain a reservoir of high-pressure air to force against the slag immediately upon the occurrence of any power interruption. The high-pressure air is supplied to the receiver through a pipe 17a by a compressor 17b which is driven by an electric motor 17c. The motor receives its electrical power from any suitable source of power such as the distributing mains 23 of a utility company (the same source also usually supplies the power for operating the low-pressure blower motor 12b).

In normal operation of the furnace, high-pressure air is conducted from the receiver through a pipe 18 and a main air valve 19 to an air-fuel compartment 20. In this compartment powdered coal or other fuel is admixed with the air. The mixture then is blown through the feed pipe 10 and the tuyères into the furnace. (Only one air-fuel compartment is shown in the drawings, but a plurality of such compartments may be provided to supply a number of furnaces, or different sections of the same furnace as described in the above-numbered Laist-Baldwin patent.)

A three-way tuyère valve 21 is included in the feed pipe line 10 leading from the air-fuel compartment 20 to the tuyères. A pipe 22 also connects the tuyère valve 21 directly to the high-pressure air receiver 17. In normal operations, as shown in Fig. 1, the setting of the valve 21 is such as to connect the air-fuel compartment 20 with the tuyères, but the valve may be turned to an emergency position connecting the tuyères directly to the high-pressure air receiver 17.

The main source of electric power 23 is connected in the conventional manner through a switch 24. This switch advantageously is of the conventional type equipped with undervoltage and overload trips so that it is opened promptly upon the occurrence of any abnormal power condition such as a power failure. It may be an oil-immersed circuit breaker of common construction.

A relay switch 25 is mechanically connected to and actuated by the power supply switch 24 so that it is normally opened but closes when the power supply switch 24 opens. The relay switch 25 is in an auxiliary electric circuit including a storage battery 26 or other auxiliary source of electric energy, a manually operated switch 27, and a relay winding 28 of a magnetic switch 29. The magnetic switch 29 is included in a second auxiliary electric circuit which also includes the switch 27, the battery 26, and a motor 30. The motor is operatively connected by a thrustor mechanism 30a and linkage 30b to a lever 31 for actuating an air control valve 32 included in a pipe line 33 connected to the high-pressure air receiver 17.

The valve 32 controls the supply of compressed air to a pneumatic cylinder 34 containing a piston 35 which is connected to a push rod 36 for operating, through a crank shaft 36a, the main air valve 19 and the tuyère valve 21. When the air control valve 32 is closed, as shown in Fig. 1, the cylinder 34 is vented to the atmosphere and the piston 35 is biased to its normal lower position by a compression spring 37. The main air valve 19 and the tuyère valves 21 then are in their respective normal operating positions connecting the compressed air reservoir 17 to the compartment 20, and connecting the compartment 20 through the air-fuel feed pipe 10 to the tuyères. When, however, the control valve 32 is opened, as shown in Fig. 2, high-pressure air is admitted to the cylinder 34 and the piston 35 is moved up, raising the push rod 36 and rotating the crank shaft 36a. Cranks 38 thereupon move the valve actuating lever 39 of the main air valve and the actuating lever 40 of the tuyère valve to close the main valve 19 and to move the tuyère valve 21 to the emergency position in which the tuyères are directly connected to the high-pressure air reservoir 17.

Integrated with the system described above, which is essentially that described in the above-mentioned Laist-Baldwin Patent No. 2,234,878, is the improvement provided by the present invention for admitting water to the tuyères upon the occurrence of a power failure. For this purpose, a water main 41 carrying water at say 20 pounds per square inch pressure is connected through a water supply pipe 42 to a distributing pipe 43, from which a branch pipe 44 extends to each tuyère. As shown in the drawings, the branch pipe 44 leads into the low-pressure air branch pipe 11, but it may communicate with the interior of the tuyère fitting 15 through any suitable connection.

A main water valve 45, which in normal operations is held closed, and a water shut-off valve 46, which during normal operations is held open, are connected in series in the water supply pipe 42. The operating lever 47 of the main water valve is connected to a push rod 48, and the handle 49 for manually operating the shut-off valve 46 is, during normal operations, held by a pin 50 on the push rod in position to keep the shut-off valve open. The push rod 48 is connected to a piston 51 in a pneumatic cylinder 52. During normal operations, the lower end of the pneumatic cylinder 52 is connected to the high-pressure air receiver by a pipe line 53 through a four-way valve 54. At the same time, the upper portion of the pneumatic cylinder 52 is vented to the atmosphere through a pipe line 55 and the four-way valve 54. The actuating lever 56 of the four-way valve is connected to one of the cranks 38 on the crank shaft 36a, so that when the latter is rotated in the event of a power failure by upward movement of the push rod 36, the four-way valve is turned 90° to reverse the high pressure and vent connections to the pneumatic cylinder 52. Thereupon the lower portion of the cylinder 52 is vented to the atmosphere and high-pressure air entering the upper portion of the cylinder forces the piston 51 and push rod 48 downwardly, opening the main water valve 45 and admitting water to the tuyères.

Operation of the system above described is as follows:

With the tuyères blowing compressed air and fuel (conveyed through the feed pipes 16) and combustion air (from the bustle pipe 12) into the body of molten slag in the furnace, the components of the system are in their normal operating positions diagrammatically illustrated in Fig. 1. Upon an interruption or failure of the power supply, however, they shift to their emergency positions (shown in Fig. 2) in the following manner: Promptly upon occurrence of the power failure, the oil switch 24 opens automatically and closes the relay switch 25, thus completing the auxiliary electric circuit through the battery 26 and relay winding of the magnetic switch 29. Closure of the magnetic switch 29 completes the second auxiliary circuit through the motor 30, which, upon being energized, actuates the thruster mechanism 30a to open the control valve 32. Compressed air from the receiver 17 then enters the cylinder 34 to move the piston 35 upwardly against the force of compression spring 37, and the accompanying movement of the push rod 36 rotates the crank shaft 36a and the cranks 38 to effect closure of the main air valve 19, to move the tuyère valves 21 to their emergency position directly connecting the tuyères to the compressed air reservoir 17, and to reverse the connections to the pneumatic cylinder 52 through the four-way valve 54. High-pressure air from the receiver thereupon enters at the top of the pneumatic cylinder 52 through the four-way valve and the pipe line 55, and the bottom of the cylinder is vented to the atmosphere. Consequently the piston 51 is forced to its lower position in the cylinder and the push rod 48 acts to open the main water valve 45. Water from the main 41 thereupon flows into the tuyères and promptly causes the molten slag at the ends of the tuyères to freeze.

The high-pressure air entering the tuyères through the valve 21 and the feed pipe 16 simultaneously with the water aids in carrying droplets of the water into contact with the slag so that the latter is rapidly chilled and forms a plug of granular material at or near the end of each tuyère. The high-pressure air supplied directly to the tuyères from the receiver 17 is itself effective for preventing molten slag from running back into the tuyères, but it is made even more effective by the plug of slag frozen at the ends of the tuyères by the water.

A continued flow of water into the tuyères would be detrimental to the furnace operation upon restoration of normal conditions. Accordingly it is advisable to close the manually operated valve 46 in the water supply line soon after the occurrence of the power failure. This valve may be closed by downward movement of its handle when the piston 51 and push rod 48 are in their lower positions, as the pin 50, which normally holds the valve 46 in its open position, is then far enough below the valve handle to permit closure of the valve. Manual closing of the shut-off valve 46 is generally satisfactory and may be accomplished sufficiently soon after a power failure has occurred to avoid injury to the furnace or to adversely affect subsequent normal operations. If desired, however, clockwork mechanism, or an electrical timer operated by an independent source of power, may be provided to close the valve 46 automatically at a predetermined time interval after the power failure has occurred and the main water valve 45 has, in consequence, been opened.

Upon restoration of the power supply, the switch 24 is closed again and the switches 25 and 29 open, deenergizing the motor 30 and thrustor 30a. The control valve 32 thereupon returns to its normal position, releasing the air pressure on the piston 35 and enabling the spring 37 to return the piston 35 and push rod 36 to its normal operating position. This results in rotating the crank shaft 36a and cranks 38 to return the four-way valve 54 to its normal operating position, and at the same time to return the main air valve 19 and the tuyère valve 21 to their normal operating positions (if they are connected to the cranks so as to effect such return automatically, as indicated in the drawings) or permit them to be reset manually in their normal operating positions (if they are connected for manual resetting as indicated in the aforementioned Laist-Baldwin patent). High-pressure air then enters the lower portion of the pneumatic cylinder 52, raising the piston 51 and push rod 48 with consequent closure of the main water valve 45. At the same time, the manually shut-off valve 46 is returned to and held by the pin 50 in its normal open position.

When normal operations are resumed after a power failure, any frozen plugs of slag at the ends of the tuyère pipes that are not quickly remelted by the heat of the molten material in the furnace may be cleared from the tuyères by punching with a steel bar in the usual manner through the check valves 16a.

The switch 27 in the auxiliary electrical circuits may be manually operated, and is provided so that the tuyère protecting system may be rendered inoperative when the furnace or its associated equipment is shut down for repairs.

As indicated in the drawings, the distributing pipe 43 for the water advantageously extends around the furnace a short distance (say about 12 inches) below the tuyères, with the branch pipes 44 extending upwardly to the tuyères. The distributing pipe and vertical legs of the branch pipes then may be kept full of water at all times so that water will enter the tuyères promptly upon opening the main water valve 45. The water normally standing in the distributing pipe 43 is under the pressure imposed on it (through the branch pipes 44) by the pressure of the air in the tuyère fittings (say ordinarily about nine pounds per square inch).

While the protective system of the invention has been particularly described above in combination with the system for admitting compressed air directly from the receiver to the tuyères, as disclosed in the aforementioned Laist-Baldwin patent, it is evident that it is not necessary for the two systems to be combined (even though the combination is particularly advantageous). If desired, the water-injection system may instead be employed alone to protect the tuyères. In such case, the connections for admitting high-pressure air from the receiver to the tuyères in the event of a power failure would be omitted.

We claim:

1. The combination with a furnace having tuyères, an air-fuel compartment, a reservoir of compressed air, and a source of electric power for providing the compressed air, of means including a main air valve for connecting said reservoir of compressed air to said compartment, means including a tuyère valve for selectively connecting the tuyères either to said compartment or directly to said compressed air reservoir, a source of water, means including a water valve through which water may be admitted from the source to the tuyères, and means operatively associated with said source of power and said valves and operated by an independent source of electric energy for immediately and automatically closing said main air valve to disconnect said compartment from said compressed air reservoir and for actuating said tuyère valve to connect said tuyères directly to said reservoir and for opening said water valve to admit water to the tuyères whenever the supply of power from said power source is interrupted.

2. The combination with a furnace having tuyères, an air-fuel compartment, a source of compressed air, and a source of electric power for providing the compressed air, of means including a main air valve for connecting said compressed air source to said compartment, means including a tuyère valve for selectively connecting the tuyères either to said compartment or to said compressed air source, a source of water, means including a water valve through which water may be admitted from the source to the tuyères, said valves being arranged to be moved to either of two operating positions in the first of which the main air valve is open to connect said compartment to said compressed air source, the tuyère valve connects the tuyères to said compartment and the water valve is closed and in the second of which the main air valve is closed, the tuyère valve connects the tuyères directly to said compressed air source and the water valve is opened to admit water to the tuyères, valve moving means for moving said valves from said first position to said second position, an auxiliary electric circuit including a source of electric energy and a switch for opening and closing the circuit, means operatively associated with said source of power for causing said switch to close said auxiliary circuit whenever the supply of power is interrupted and to open said circuit when the supply of power is resumed, and electromotive means included in said circuit and operatively connected to said valve moving means and adapted when energized by the closing of said circuit to actuate said valve moving means to move said valves to their aforesaid second positions.

3. The combination with a furnace having tuyères, a reservoir of compressed air, means through which compressed air is normally admitted to the tuyères, and a power supply for providing the compressed air, of a source of water, a valve through which water may be admitted from said source to the tuyères, pneumatic means arranged to be actuated by compressed air from the reservoir to open said valve, and means responsive to an interruption in the power supply for admitting air from the reservoir to the pneumatic means so that the latter is actuated to open the valve whenever the power supply is interrupted.

4. The combination with a furnace having tuyères, a reservoir of compressed air, means through which compressed air is normally admitted to the tuyères, and a power supply for providing the compressed air, of a source of water, a valve through which water may be admitted from said source to the tuyères, pneumatic means normally actuated by compressed air from said reservoir to hold said valve closed but arranged to be actuated by compressed air from the reservoir to open said valve, and means responsive to an interruption in the power supply for admitting air from the reservoir to the pneumatic means so that the latter is actuated to open the valve whenever the power supply is interrupted.

5. In the combination of a furnace having tuyères, an air-fuel compartment normally connected to said tuyères for blowing air and fuel therethrough into a molten charge in the furnace, a source of compressed air normally connected through a compressed air reservoir to said compartment, a normal source of power for providing the compressed air, and an emergency control operable for disconnecting said reservoir from said compartment and for directly connecting the reservoir to the tuyères when said normal source of power fails, the improvement which comprises a water supply system, and means operated by said emergency control for simultaneously admitting water from said supply system to the tuyères when the reservoir is connected directly to the tuyères under emergency conditions.

6. In the combination of a furnace having tuyères, a reservoir of compressed air, a supply of power for providing the compressed air, an air-fuel compartment for supplying air and fuel to said tuyères under normal conditions for introduction into the furnace, valve means for selectively connecting the tuyères to either said air-fuel compartment or directly to said reservoir of compressed air, an emergency control system connected with said power source and with said valve means and operative for selectively controlling said valve means to disconnect the tuyères from said air-fuel supply compartment and to connect the tuyères directly to said compressed air reservoir whenever said supply of power is interrupted by emergency conditions, the improvement which comprises a source of water, and a water valve through which water may be admitted from the source thereof to the tuyères, said water valve being operatively connected to said control system for opening said water valve to admit water to the tuyères whenever said supply of power is interrupted by said emergency conditions.

7. In the combination of a furnace having tuyères, an air-fuel supply compartment normally connected to the tuyères for blowing air and fuel into a molten charge in the furnace, and a source of power for providing air under pressure for said air-fuel supply, the improvement which comprises a source of water, a valve through which water may be admitted from the source thereof to the tuyères, and an emergency control operative to simultaneously (1) disconnect the tuyères from the air-fuel supply compartment and (2) open said valve to admit water to the tuyères whenever the supply of power from its source is interrupted.

EARL M. BALDWIN.
ROBERT L. THOMPSON.

REFERENCES CITED

The following references are of record in the file of this patent:

UNITED STATES PATENTS

| Number | Name | Date |
|---|---|---|
| 749,258 | Cochran | Jan. 12, 1904 |
| 1,135,489 | Baggaley | Apr. 13, 1915 |
| 1,344,333 | Clouston | June 22, 1920 |
| 1,888,317 | Hind | Nov. 22, 1932 |
| 2,334,878 | Laist et al. | Nov. 23, 1943 |

FOREIGN PATENTS

| Number | Country | Date |
|---|---|---|
| 183,418 | Great Britain | Nov. 16, 1922 |